United States Patent

[11] 3,621,250

[72] Inventor Hanns J. Wetzstein
Wayland, Mass.
[21] Appl. No. 39,723
[22] Filed May 22, 1970
[45] Patented Nov. 16, 1971
[73] Assignee American Cyanamid Company
Stamford, Conn.

[54] CODING OF SYMBOLS WITH PHOTOLUMINESCENT MATERIALS FOR READOUT TO OBTAIN PROPER SEQUENCE SIGNAL READOUT FROM RANDOM READING OF SYMBOLS

5 Claims, 2 Drawing Figs.

[52] U.S. Cl. .......... 250/71 R, 235/61.11, 250/71.5 R, 250/219 Q, 250/226, 340/173 LM
[51] Int. Cl. .......... G01j 3/06
[50] Field of Search .......... 250/71 R, 71.5 R, 83.3 H, 219, 226, 83.3 UV; 235/61.11; 340/146.3, 173 LM

[56] References Cited

UNITED STATES PATENTS 3,444,517 5/1969 Rabinow .......... 250/71 R X
3,486,006 12/1969 Siegel .......... 250/71 R X
3,500,047 3/1970 Berry .......... 250/71 R

*Primary Examiner*—James W. Lawrence
*Assistant Examiner*—Morton J. Frome
*Attorney*—Samuel Branch Awalker

ABSTRACT: Coded inks are described having one or more photoluminescent components to represent different symbols which can then be read out by ultraviolet illumination. For example, six components can represent 63 different symbols by their presence or absence in a mark. A set of components is divided into two groups, for example, four and two in the case of six components. The four components are sufficient to generate 15 different symbols, for example, more than enough to represent 10 digits. These symbols are printed in four spatially separated small marking areas which may be circles or squares. Four digits, if arranged sequentially can represent the numbers 0 to 9,999; however, their sequence has to be known. The other group of components, for example two is incorporated into the marks to define the intended sequence of symbols regardless of the actual sequence in which marks are read.

INVENTOR.
HANNS J. WETZSTEIN
BY
Samuel Branch Walker
ATTORNEY

CODING OF SYMBOLS WITH PHOTOLUMINESCENT MATERIALS FOR READOUT TO OBTAIN PROPER SEQUENCE SIGNAL READOUT FROM RANDOM READING OF SYMBOLS

BACKGROUND OF THE INVENTION AND RELATED APPLICATIONS

Coded inks have been developed utilizing components which are photoluminescent, preferably some of them being complexes of lanthanide ions having atomic numbers greater than 57 which luminesce in very narrow bands. The code depends on the presence or absence of one or more of the components in a particular marking area. Normally a coded symbol is not printed in spatially separated areas for each component within a marking area, although this is possible. However, in any event, the whole marking area must be read as a single symbol. If the coding is based on the presence or absence of a component, the number of different symbols which can be represented is $2^n-1$. Thus four components permit 15 different symbols, six components 63, etc. While it is possible to use the coded components in more than two concentrations, for example absence, half concentration and full concentration, which would give a choice of $3^n-1$ symbols, the precision of readout suffers somewhat; and in analogy to signal to noise ratio in electronic circuits, this results in somewhat lower accuracy or requires greater precision in quantitative readout of the different fluorescing colors.

The coded inks using photoluminescent material are described and claimed in the patent of Freeman and Halverson, U.S. Pat. No. 3,473,027, Oct. 14, 1969.

A very significant problem is presented by the fact that there are only a limited number of narrow band luminescent materials based on lanthanide ions, such as chelates or other complexes, and the efficiency in transforming ultraviolet light to longer wavelength light varies with the compounds of the different lanthanide ions. There are, of course, hundreds of organic compounds which fluoresce under ultraviolet; however, these are broad band fluorescers, the band width being more than 400 A, usually considerably more, and this means that normally only one, or at the most two, broad band luminescent substances can be included as components in a coded ink, because otherwise overlapping of the spectra of luminescence response can cause confusion.

While the number of coded symbols is limited as above described, it is, of course, possible to have a large number of coded symbols or marks arranged in a particular sequence, for example a series of numbers on the bottom of a bank check. However, such arrangements of symbols to convey a message require sequential reading and thus require good orientation of the symbols or marks as they are presented to the reader. With bank checks, for example, which are more or less of uniform size, the readout problem is not too difficult. If the nature of the objects or articles on which the message in symbols have been encoded is such that they cannot readily be positioned and oriented for a predetermined sequential reading, the problem is not solved. For example, coded labels on parcels or other packages of different shapes may not lend themselves to practical oriented sequential readout, and so the problem of random orientation has not been solved.

SUMMARY OF THE INVENTION

The present invention relates to a particular way of coding using photoluminescent coded inks which permits readout of a finite set of coded ink marks on materials or objects which do not lend themselves to precise readout orientation. This may be considered as a random orientation readout instead of a predetermined precise sequential readout. It should be understood, as will appear from more detailed description below, that the readout may, and usually does, involve scanning mechanisms, and it involves more than a single area imprinted, although usually a very small number of areas. An essential feature of the invention involves a readout apparatus or readout method in which spatially separated marks are sensed individually without appreciable overlap.

The present invention divides the total number, N, of photoluminescent components into two mutually exclusive subgroups, one with K components and one with N–K components, N must be at least 3, K must be greater than 1, and N–K at least as great as 1. One subgroup with K components is utilized to encode one type of information within the area of a mark, and the other subgroup, with N–K components, encodes another type of information within the same mark. These two types of information encoded in the same mark usually will bear some relationship to each other, but this is not essential and the invention is not limited thereto. The code established must be such that one, but not necessarily both, of the subgroups always has a least one of its components present in a mark. Obviously the total number of different components could be divided into more than two mutually exclusive subgroups. However, because of the limited number of suitable luminescent components is restricted, in general not more than six or seven are available, the approach of dividing into more than two mutually exclusive groups is not ordinarily practical, though the present invention is not rigorously restricted thereby. In more specific aspects, however, the splitting of the number of components into two mutually exclusive subgroups is covered, and this constitutes a preferred embodiment.

A particularly useful form of the present invention utilizes one of the subgroups to encode the sequence of coded ink marks within a given set of marks. One set of marks is distinguished from another set by other means, such as a wider separation between sets of marks on a continuous substrate than is the separation between marks within a given set, or by different sets being on different substrates, as for example different sets being on separate packages. An example will serve to illustrate the operation of the invention more clearly.

Let us take the situation of a group of six different luminescent components, designated A, B, C, D, E and F. Assume that they are divided into two subgroups, one of 4: A, B, C and D, and one of 2: E and F. In other words, in the general statement above, K is 4 and n–K is 2. As has been stated above in the description of the background of the invention, the group of K components when used as a presence or absence code permits 15 separate symbols, $2^4-1$. The N–K group of two components, E and F, permits 4 different choices: E, F, E+F, and no component. It will be noted that the K group required that there be always at least one component in a mark, but this is not true with the N–K group because the absence of both E and F can be sensed.

To take a very simple numerical illustration, let us assume that we utilize 10 of the 15 possible symbols of the K group to represent the 10 digits. The N–K group can then represent the power of 10 multipliers of the digits: E for ones, F for tens, E+F for hundreds, and the absence of both of them for thousands. If we print four spatially separated marks, for example four small rectangles or circles in the corners of a square or in a linear sequence, each mark not only contains one or more components from the K group, but also has one of the combination of the N–K group. Then the digits will be read as thousands, hundreds, tens, and units regardless of the particular position of the marks. In other words, the marks do not have to be read in a particular sequence since their values are fixed by the code from the N–K group associated with the marks. For example, let us assume we wish to represent the number 4196. The combination for the digit 4 is associated with neither E nor F, the combination for 1 is associated with both E and F, the combination for 9 with F only, and the combination for 6 with E only. The four marking areas do not need to be oriented in this particular sequence because regardless of the actual sequence in which they are read, as by a simple scanner, their true sequence is fixed. It will be noted that this permits presenting numbers up to 9999. It will be seen that not all of the possible symbols from group K are used; only 10 of the 15 possible. The others may be used for other symbols, for example +, –, =, or other mathematical symbols. If all of the numbers are not needed, some of them, for example those above 9800, may be used to represent letters or other symbols.

An even more practical example of the above division into groups of four and two may be used for destination for luggage or parcels on a particular railroad or airline. In this case all of the fifteen choices of group K could be utilized, and this gives a sufficient number of letters to represent the particular stations. The N–K group, E and F, could then be used to indicate the letter sequence, and this would permit representing any sequence of four of the 15 letters chosen. The luggage label or ticket therefore, could be read mechanically regardless of its orientation. Where a smaller number of letters is used, for example as is common with airline luggage, one of the possibilities of the N–K group could be left unused, for example, the situation where neither E nor F are to be present. In other words, each letter would be associated by one or both E and F.

If one more luminescent component is available, N becomes 7, and one way this can be broken up is to have K=4 and N–K=3. As before, K can be used to encode digits and now N–K permits eight possibilities, $2^3$, permitting coding of numbers of one less than 100 million. In this case, of course, there would have to be eight separated marks, such as dots in a line, around a circle, or other convenient manner.

There are other ways in which a set of four coded ink marks, utilizing six luminescent components, can provide comparable information, but the logical elements for decoding the information are not as simple. One such method is to take 60 of the 63 coded inks possible for a six-component system and divide them up into four groups of 15 inks each. Then take the first group of 15 inks and and identify a given letter in the first position of an ordered four sequence set with a given one of these inks. Next take the second group of 15 inks and identify a given letter in the second position of the sequence with a given ink, and so forth for the remaining two groups of inks. With this assigned code, a set of four marks made from four appropriately selected coded inks out of this group of 60 coded inks will provide an unambiguous sequence of four letters, independent of the order in which the marks are read. The logical correlation is not nearly as simple as in the previous code, and hence is more costly to construct.

DESCRIPTION OF THE PREFERRED EMBODIMENTS

Figure 1:
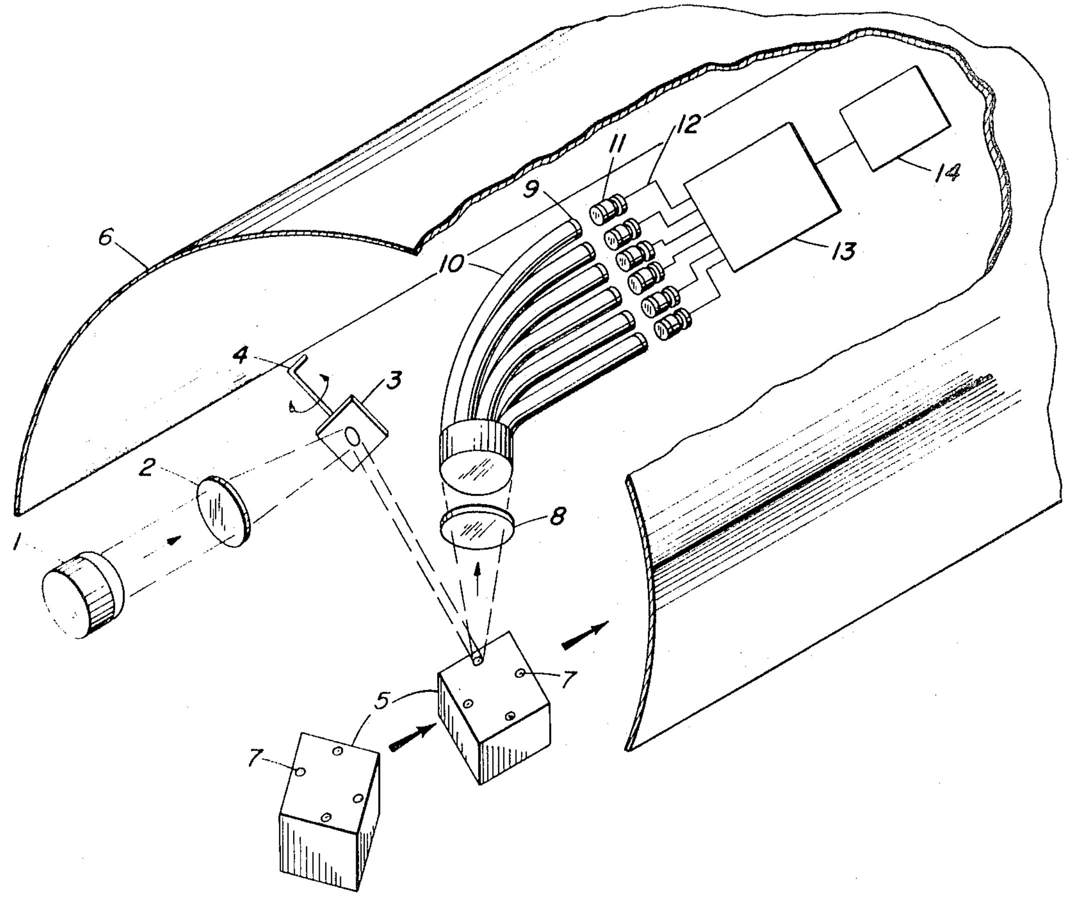
FIG. 1 is a diagrammatic showing in perspective of a scanner for six components.

The drawings show in diagrammatic form a very simple scanner for six components divided K=4, N–K=2. It should be noted that in the drawings tops of square boxes are shown passing a reading station, the boxes being transported in the direction indicated by a conveyor. Each box top has four separate coded ink marks on it, one near the center of each edge. While the boxes stand upright on the conveyor, they may jiggle and rotate about a vertical axis during transport. At the reading station there is an optical scan for coded ink marks perpendicular to the direction of conveyor transport. The present invention has nothing whatsoever to do with the particular design of readout and the drawings are merely for the purpose of showing one simple form which can be used.

Figure 2:
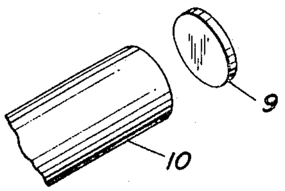
FIG. 2 is an enlarged detail of one fiber optic imaging lens.

FIGS. 1 and 2 illustrate a very simple mechanism is semidiagrammatic form. It is necessary that the mechanism be shielded from ambient light. In order not to confuse the drawings in FIG. 1, only a small portion of the shield is shown at 6, the remainder being broken away. Box tops 5 with the dots 7 are moved along by a conveyor in accordance with the direction of the arrow in FIG. 1. A source of ultraviolet light 1 is focused by a lens 2 and a plane mirror 3 onto the plane of the box tops. The focused beam is intense but covers a very small area which is less than the spacing between dots. The mirror 3 is oscillated rapidly through a small arc by conventional means, which is diagrammatically shown. The ultraviolet beam rapidly scans the moving box tops 5 transversely, and each mark is illuminated at least once during the passage of the box tops past this reading station. A conventional edge detector (not shown) is mounted alongside the conveyor to signal each time a box leaves the reading station.

When illuminated with ultraviolet light, each area luminescent in the colors corresponding to the code components in the area. This radiation is focused by the lens 8 onto the plane of a series of six filters 9 which are on the end of fibers which transfer the radiations to an array of six detectors 11. These detectors are own diagrammatically as their nature is not of significance. Where only visible light is involved there is some advantage in using photomultiplier tubes because of their greater sensitivity, but this is balanced by the greater separation needed for the detectors.

The signals from the detectors pass through the cable 12 to electronic signal processing and logic circuits, diagrammatically shown at 13. These circuits respond to combinations of the particular detectors energized and may be considered as a greatly simplified or rudimentary computer of conventional design. The computer 13 then signals to a readout mechanism, which is also of conventional design and which is represented at 14. This reproduces the original symbols and completes the readout.

Turning to more practical uses, the following is an illustration of a six component system for warehouse control.

A distribution warehouse stocks conical-shaped cartons whose contents have a useful storage life of 42 days. The expiration date for each carton can be indicated on the carton, and is used to indicate whether shipment is safe or not. The only unique, stable geometric orientation of the carton is with the bottom of the cone down, but there can be any degree of rotation about the cone axis. Cartons are transported along a conveyor belt in this stable position to loading ramps.

Combining the present invention with the photoluminescent coded ink system, the expiration date can be recorded on the bottom of each carton via four coded ink marks, and the information can be retrieved independent of the rotation of the cartons. Using six active components, designated *a, b, c, d, e, and f,* let one subgroup include *a* and *b*, and the other subgroup include *c, d, e,* and *f*. Thus N=6, K=4, and N–K=2. Symbolically the four coded ink marks can be represented as $$A_\alpha,\ A_\beta,\ A_\gamma,\ A_\delta,$$

where A symbolizes the tens position for the day of the months, A symbolizes the month of the year, and A symbolizes the last digit of the year. It is convenient to code $\alpha$ as "*a*" where *a* represents the active component *a* but not *b* in the mark, $\beta$ as "*b*" where *b* represents the active component *b* but not *a* in the mark, $\gamma$ as "*ab*" where *ab* represents both components *a* and *b* in the mark, and $\delta$ as the absence of both *a* and *b* in the mark.

A convenient code for the remaining active components in the four marks is sketched in table I below. The columns headed *c, d, e,* and *f* give the code, based on presence P or absence A of the particular active component in a coded ink mark, for the specific information in each row of the columns headed $A_\alpha$, $A_\beta$, $A_\gamma$, and $A_\delta$, depending on the subscript.

TABLE I

| $A_\alpha$ | $A_\beta$ | $A_\gamma$ | $A_\delta$ | c | d | e | f |
|---|---|---|---|---|---|---|---|
| 1 | 1 | Jan. | b 1 | P | A | A | A |
| 2 | 2 | Feb. | 2 | A | P | A | A |
| 3 | 3 | Mar. | 3 | P | P | A | A |
| | 4 | Apr. | 4 | A | A | P | A |
| | 5 | May | 5 | P | A | P | A |
| | 6 | June | 6 | A | P | P | A |
| | 7 | July | 7 | P | P | P | A |
| | 8 | Aug. | 8 | A | A | A | P |
| | 9 | Sept. | 9 | P | A | A | P |
| | 0 | Oct. | 0 | A | P | A | P |
| | | Nov. | | P | P | A | P |
| | | Dec. | | | A | P | P |
| | | | | | | A | P |

The physical arrangement of the four coded ink marks on the bottom of the carton is not critical, provided the reading device can sense all four and resolve them. Assuming the cartons move in one direction along the conveyor, a gap in the bottom of the conveyor provides a rectangular opening across which the marks move. The reading unit then will include a scanning device, such as an oscillating mirror, which scans along the direction perpendicular to the carton motion. Thus, the combination of carton motion, plus the reader scanning motion allows sensing over the bottom surface of the carton. An auxiliary unit, such as an edge detector, can signal the reader when one carton leaves the reading station to be ready for the next carton coming along.

This coding scheme allows a number of checks also. Four marks must be read for each carton or there is an error. Repeated sensing of the same mark does not cause problems since it has a unique subscript. Rotation of the carton around the cone axis does not cause problems. A convenient geometrical form for the four marks consists of four dots at the corners of a square, making certain that the gap between any two dots is large enough to allow satisfactory resolution.

The first 10 horizontal lines of the table for components *c*, *d*, *e*, and *f* are typical of coding of 10 digits, and so, of course, could be used for the representation of numbers, which has been described above in the summary portion of the specification for either six- or seven-component systems. Another practical instance of the use of the present invention is in reading parcel labels. Parcels may be of various different shapes with a code for different cities or areas printed by a very simple, portable machine on a gummed label. If seven components are available, the label can also carry a postal zip code, which is of importance in parcel post shipments. If the parcels are placed on a conveyor belt for sorting, orientation requirements as they pass a reading station are simplified, since the coded ink marks on a given label can be sensed in any sequence. Sorting can be effected by conventional means, the label signal actuating well-known devices for discharging a parcel into various bins depending on the label. The same thing can be done by large users for mail which may have different envelope sizes and which is not readily sorted by present sorting machines. If a five-digit zip code is to be used, of course it would be necessary to have seven components. Obviously, of course, the sorting mechanism must space articles sufficiently so that there will be no overlap in readout.

The specific examples given above all deal with a preferred form of the present invention, in which both of the groups have more than one component. It will be noted, however, that the present invention is still useful if the N–K group contains only a single component. This still permits sequencing two marks, because the component can be either present or absent. However, the number of possibilities with a given number of components is so greatly increased when both groups have more than one component that this constitutes a preferred modification.

The preceding description of the present invention deals only with the coding portion which is read by ultraviolet light illumination. If it is desired that the message be secret, for example identification of origin or in some case the expiration date of material in a warehouse, which has been specifically described, the coded symbols are not accompanied by any visually readable symbols. In many other cases, such as, for example, the luggage identification or the parcel post labels, there will be visual data given as well as the coded data. The possibility of messages which are either secret or both visually and photoluminescently readable is the same advantage that is shared by the coded ink systems referred to above in related applications. It is an advantage of the present invention that the elimination of the necessity for orientating marking labels in a particular sequence is obtained without sacrifice of any of the inherent advantages of the photoluminescent coding.

I claim:

1. A process for retrieval of information from spatially separate, randomly oriented, information containing areas, said information intended to form a readout of particular sequence, said process comprising, a. providing coded information in a plurality of spatially separate marking areas, the code involving at least N number of coding components which are photoluminescent in different wavelength bands under ultraviolet illumination, wherein N is at least three, b. dividing N luminescent components into two mutually exclusive subgroups designated K and N–K, K being $>1$, c. each marking area having at least one coding component from subgroup K, d. the coding components from subgroup N–K designating the coding scheme or sequence applicable to coding components from subgroup K in the same working area, and e. illuminating the marking areas in any sequence with ultraviolet light, detecting the photoluminescence of the individual components from each spatially separated marking area and transforming the result into a readout signal, said signal having information in sequence according to the coding components.

2. A process according to claim 1 in which N is greater than 3, and both K and N–K are greater than 1.

3. A process according to claim 2 in which the number of spatially separated areas is equal to $2^{N/K}$.

4. A process according to claim 3 in which N is 6 and K is 4.

5. A process according to claim 3 in which N is 7 and K is 4.

* * * * *